United States Patent
Kim et al.

(10) Patent No.: US 10,131,365 B2
(45) Date of Patent: Nov. 20, 2018

(54) VEHICLE SAFETY DEVICE USING VISIBLE LIGHT COMMUNICATION

(71) Applicant: YUYANG DNU CO., LTD, Hwaseong-si, Gyeonggi-do (KR)

(72) Inventors: Sangok Kim, Seoul (KR); Byungoh Kim, Suwon-si (KR); Dongsik Kim, Siheung-si (KR); Sang-ho Yoon, Suwon-si (KR)

(73) Assignee: YUYANG DNU CO., LTD (KR)

( * ) Notice: Subject to any disclaimer, the term of this patent is extended or adjusted under 35 U.S.C. 154(b) by 0 days.

(21) Appl. No.: 15/551,232

(22) PCT Filed: Jul. 17, 2015

(86) PCT No.: PCT/KR2015/007445
§ 371 (c)(1),
(2) Date: Aug. 15, 2017

(87) PCT Pub. No.: WO2016/133251
PCT Pub. Date: Aug. 25, 2016

(65) Prior Publication Data
US 2018/0065644 A1    Mar. 8, 2018

(30) Foreign Application Priority Data

Feb. 16, 2015 (KR) .................. 10-2015-0023582

(51) Int. Cl.
*B60W 50/14* (2012.01)
*B60Q 5/00* (2006.01)
(Continued)

(52) U.S. Cl.
CPC ............ *B60W 50/14* (2013.01); *B60Q 1/525* (2013.01); *B60Q 5/00* (2013.01); *B60R 21/013* (2013.01);
(Continued)

(58) Field of Classification Search
CPC ........ G08G 1/161; G08G 1/166; G08G 1/167; B60W 30/08; B60W 30/0956; B60W 50/14; B60R 21/013; B60Q 5/00; B60Q 1/525
See application file for complete search history.

(56) References Cited

U.S. PATENT DOCUMENTS 8,436,747 B2    5/2013  Schoepp
9,240,840 B2    1/2016  Jang et al.
(Continued)

FOREIGN PATENT DOCUMENTS

JP    2007-314016 A    12/2007
JP    2010-507531 A    3/2010
(Continued)

OTHER PUBLICATIONS

International Search Report (in English and Korean) and Written Opinion (in Korean) of the International Searching Authority issued in PCT/KR2015/007445, dated Oct. 15, 2015, ISA/KR.

*Primary Examiner* — Leon Flores
(74) *Attorney, Agent, or Firm* — Harness, Dickey & Pierce, P.L.C.

(57) ABSTRACT

A vehicle safety device using visible light communication is disclosed. A vehicle safety apparatus using visible light communication includes a brake sensor on a main vehicle brake pedal for generating a deceleration signal by a degree of braking, an acceleration sensor on a main vehicle accelerator pedal for generating an acceleration signal by a degree of acceleration, a visible light receiver for receiving a preceding-vehicle signal from at least one preceding vehicle and a following-vehicle signal from at least one following vehicle, a visible light transmitter for transmitting a main vehicle signal to the preceding vehicle and vehicles, a collision risk determination unit for determining whether a danger of collision is present based on the preceding-vehicle (Continued)

signal, the following and main-vehicle signal, and an alarm unit for issuing an alarm to driver in response to the collision risk determination unit determining the presence of a danger of collision.

19 Claims, 5 Drawing Sheets

(51) Int. Cl.
  *B60R 21/013*  (2006.01)
  *B60W 30/08*  (2012.01)
  *B60Q 1/52*  (2006.01)
  *B60W 30/095*  (2012.01)
  *G08G 1/16*  (2006.01)

(52) U.S. Cl.
  CPC ........ *B60W 30/08* (2013.01); *B60W 30/0956* (2013.01); *G08G 1/161* (2013.01); *G08G 1/166* (2013.01); *G08G 1/167* (2013.01); *B60W 2050/146* (2013.01); *B60W 2550/308* (2013.01)

(56) References Cited

U.S. PATENT DOCUMENTS

| | | | |
|---|---|---|---|
| 2006/0125616 A1* | 6/2006 | Song | B60Q 1/38 340/463 |
| 2009/0265107 A1* | 10/2009 | Matsuno | G08G 1/165 701/301 |
| 2017/0205236 A1 | 7/2017 | Braunberger et al. | |

FOREIGN PATENT DOCUMENTS

| | | |
|---|---|---|
| KR | 10-2010-0019034 A | 2/2010 |
| KR | 10-2010-0049488 A | 5/2010 |
| KR | 10-2013-0009132 A | 1/2013 |
| KR | 10-2015-0015860 A | 2/2015 |

* cited by examiner

VEHICLE SAFETY DEVICE USING VISIBLE LIGHT COMMUNICATION

CROSS-REFERENCE TO RELATED APPLICATION

This application is a U.S. National Phase Application under 35 U.S.C. 371 of International Application No. PCT/KR2015/007445 filed on Jul. 17, 2015 and published in Korean as WO 2016/133251 A1 on Aug. 25, 2016. This application claims priority under 35 U.S.C § 119(a) of Patent Application No. 10-2015-0023582, filed on Feb. 16, 2015 in Korea. The entire contents of the above applications are incorporated herein by reference. In addition, this non-provisional application claims priority in countries, other than the U.S., with the same reason based on the Korean patent application, the entire content of which is hereby incorporated by reference.

TECHNICAL FIELD

The present disclosure in some embodiments relates to a vehicle safety device using visible light communication.

BACKGROUND

The statements in this section merely provide background information related to the present disclosure and do not necessarily constitute prior art.

Vehicle can provide comfort for human beings, but accidents concerning the operation of vehicles are still a problem to be solved. The number of deaths from automobile accidents worldwide is reported to reach 1 million every year, accidents reaching 50,000 cases.

Attempts have been made for a long time to solve the vehicle safety issues. Among them, in particular, various techniques have been studied for exchanging information between adjacent vehicles by way of vehicle-to-vehicle communication using radio frequency (RF) and controlling an actuator and a steering wheel by applying a collision avoidance algorithm based on the exchanged information.

The control technology using the collision avoidance algorithm is held from engaging automatically until a dangerous situation does occur, which gives rise to a need for a safety service provision technology that can constantly assist drivers with positive danger prevention.

Meanwhile, visible light communication is a noteworthy state-of-the-art technology which is to utilize light from a source such as LED (Light Emitting Diode) which emits light by a semiconductor as a carrier wave for carrying and transmitting information. The visible light communication utilizes visible light having a wavelength of 780 nm to 380 nm, which has the advantage of providing communications simultaneously with illumination.

Visible lighting equipment is the single element that the visible light communication needs to utilize and the head lights and taillights attached to a vehicle may be used as they are for a communication means, requiring no separate communication infrastructure or equipment. In addition, no crosstalk thanks to the straightness of the light precludes the issue of radio wave crosstalk caused by multiple vehicles, which is a drawback of existing radio frequency communication. The visible light communication can be driven with low power consumption, which makes it very suitable to be used for communication between vehicles. Moreover, the light is much more accurate than the radio waves in terms of precisely recognizing positions.

Patents have been disclosed recently concerning the safety of vehicles using such visible light communication, but there is no provision of a concrete and practical means which can be widely spread by applying visible light communication.

Korean Patent Publication No. 10-2013-0009132 (published Jan. 23, 2013) discloses a vehicle control device using visible light communication for decelerating the speed of the user's main vehicle by detecting a sudden deceleration from a preceding vehicle's speed information received through visible light communications. The disclosed device is designed to operate upon detecting a deceleration of the preceding vehicle (vehicle ahead), and therefore the preceding vehicle when perceiving a dangerous situation ahead leaves the following main vehicle incapable of counteracting immediately.

A brake pedal installed in a vehicle emits a red taillight only with the driver's operation and gives a warning to the driver of the following vehicle. In addition, the red taillight is designed to light with the same brightness regardless of the strength by which the driver operates the brake pedal. This leaves the driver of the following vehicle ignorant of any possible emergency situation lying ahead.

There are also drivers who do not operate the brake pedal with the intention of not wanting to decelerate even if their preceding vehicle has operated the brake pedal. In such a case, the following vehicle is in danger of keeping to drive with acceleration not knowing if a lead vehicle operated brake pedal or not because it was occluded by the preceding vehicles (vehicles ahead). Therefore, when an incident occurs ahead, the following vehicle operators looking only at the brake taillight of the lead vehicle risk a chain collision due to a sudden stop of the lead vehicle.

Besides such an extreme situation, with brake taillights designed to be lit upon operating the brake pedal, the driver is uninformed of details, such as whether the lead vehicle operator gently put the foot on the brake pedal. This would mislead a driver to accelerate watching only that the lead vehicles' brake taillights are not lit until the driver suddenly returns to the brake pedal operation subsequent to the lead vehicles' brake pedal operation, which leads to road safety issues.

In addition, on the side of the preceding vehicle, a suspected, but unidentifiable accelerator pedal operation of its following vehicle hinders the preceding vehicle from braking in a quick timely manner due to a concern for a rear-ending accident by that following vehicle.

Further, the general principle of making a lane change is to confirm the following vehicle in the next lane to go to, and at the same time, it is necessary to check also the preceding vehicle, so there are needs for informing the distance to the following vehicle and/or alerting the driver of the danger at the lane change.

DISCLOSURE

Technical Problem

Accordingly, the present disclosure in at least one embodiment provides a vehicle safety apparatus using visible light communication to solve the above-mentioned deficiencies.

In a first embodiment, where any one of preceding vehicles has its brake pedal operated, the driver of a main vehicle is warned of the risk of collision when the driver operates the accelerator pedal.

In a second embodiment, where any one of following vehicles has its accelerator pedal operated, the driver of a main vehicle is warned of the risk of collision when the driver operates the brake pedal.

In a third embodiment, where the driver of a main vehicle turns its turn signal on in order to change the lane or change the direction, the driver is warned of the risk of collision when the following vehicle in the lane to which the turn signal is activated is within a preset distance.

In a fourth embodiment, a display unit is adapted to display a situation where the drivers of the preceding vehicles are placing their feet on the brake pedals, activating the brake pedals, or pressing the brake pedals to the floor. In addition, when the turn signal is on, the display unit displays the distance to the following vehicle in the lane to which the turn signal is activated.

SUMMARY

According to at least one embodiment of the present disclosure, a vehicle safety apparatus using visible light communication includes a brake sensor, an acceleration sensor, a visible light receiver, a visible light transmitter, a collision risk determination unit and an alarm unit. The brake sensor is mounted to a brake pedal of a main vehicle to generate a deceleration signal according to a degree of braking. The acceleration sensor is mounted to an accelerator pedal of the main vehicle to generate an acceleration signal according to a degree of acceleration. The visible light receiver is configured to receive a preceding-vehicle signal from at least one preceding vehicle and a following-vehicle signal from at least one following vehicle. The visible light transmitter is configured to transmit a main vehicle signal to the preceding vehicle and the following vehicle. The collision risk determination unit is configured to determine whether there is a danger of collision based on the preceding-vehicle signal, the following-vehicle signal and the main vehicle signal. The alarm unit is configured to issue an alarm to a driver in response to the collision risk determination unit determining the presence of a danger of collision.

Advantageous Effects

As described above, according to the present disclosure, when the driver of the main vehicle operates the accelerator pedal while any one of the following vehicles is operating its brake pedal, the driver receives an alarm signal, so as to reduce the risk of collision with the preceding vehicle as well as the waste of fuel due to unnecessary acceleration.

In addition, when the driver of the main vehicle operates the accelerator pedal while any one of the following vehicles is operating its accelerator pedal, the driver receives an alarm signal, so as to reduce the risk of collision with the preceding vehicle and inform the driver of the timing for operating the brake pedal.

In addition, when making a lane change or direction change, the driver is provided with an alarm signal according to the distance to the following vehicle for enabling the driver to safely change the lane or steer as desired.

In addition, intuitive information is displayed for a driver on a display unit about whether the drivers of the preceding vehicles are placing their feet on the brake pedals, operating the brake pedals, or depressing the brake pedals to the fullest. This informs the driver of the timing for operating the accelerator pedal especially on the congested road, reduces the risk of collision with the preceding vehicles, and tells the driver, when making a lane change or steering, the distance to the following vehicle.

Unlike the conventional vehicle safety device which has reported to the main vehicle by inter-vehicle communication only with changing speeds of the preceding vehicle, the present disclosure in some embodiments provides the driver with an early information of when the preceding vehicle's driver places the foot on the brake pedal before the speed of the preceding vehicle is decelerated, and thereby enables the driver to instantaneously detect traffic changes due to traffic situations further ahead, which is greatly useful for safe driving.

In addition, a vehicle safety device using visible light communication according to some embodiment of the present disclosure needs no separate external network, requiring low device complexity toward a high distribution rate. Then, the driver can easily grasp the state of the road traffic to take immediate action without using a collision algorithm.

DETAILED DESCRIPTION

Hereinafter, some embodiments of the present disclosure will be described in detail with reference to the accompanying drawings.

Figure 1:
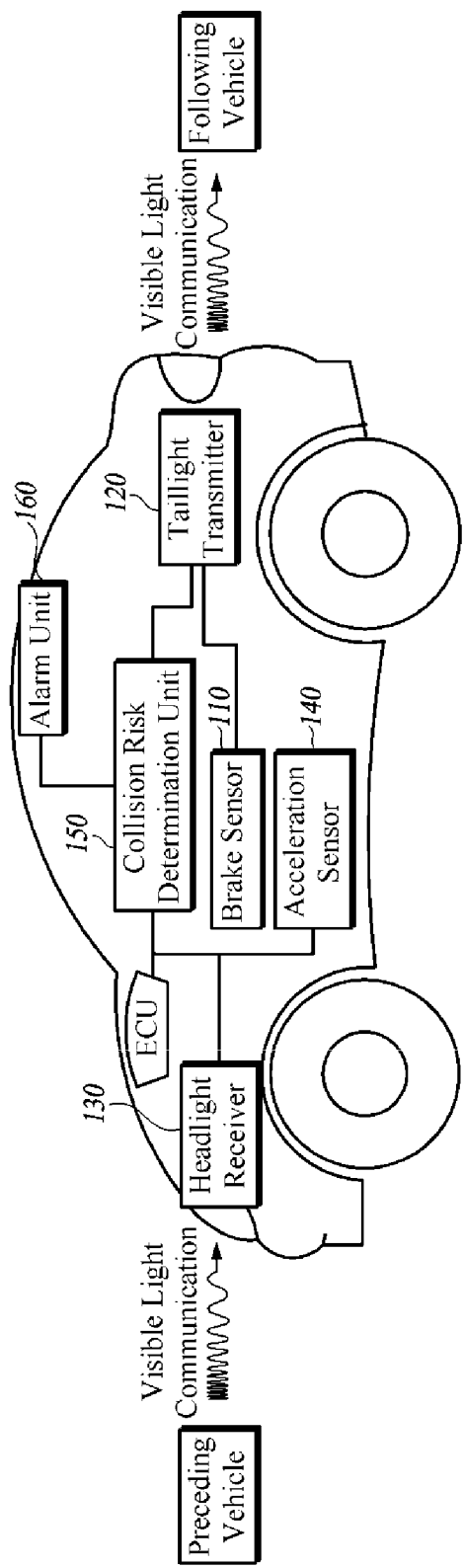
FIG. 1 is a schematic block diagram of a vehicle safety apparatus using visible light communication according to a first embodiment of the present disclosure.

FIG. 1 is a schematic block diagram of a vehicle safety apparatus using visible light communication according to a first embodiment of the present disclosure.

Referring to FIG. 1, the vehicle safety apparatus using visible light communication according to the first embodiment includes a brake sensor 110, a taillight transmitter 120, a headlight receiver 130, an acceleration sensor 140, a collision risk determination unit 150 and an alarm unit 160.

The brake sensor 110 is installed on a braking system of the vehicle, for example, a brake pedal, which is installed with the vehicle safety apparatus using visible light communication according to this embodiment.

The brake sensor 110 distinguishes and detects when the driver operates the brake pedal with a weak strength from when the brake pedal is strongly operated. Therefore, the brake sensor 110 detects an event of operating the brake pedal by the driver below a preset strength to generate a weak deceleration signal, and detects another event of operating the brake pedal by the driver with or above the preset strength to generate a strong deceleration signal.

The brake sensor 110 transmits a weak deceleration signal and a strong deceleration signal to the taillight transmitter 120.

In the vehicle safety device using visible light communication according to the first embodiment, the taillight transmitter 120 and the headlight receiver 130 respectively are illumination apparatuses having a visible light communication function installed in a taillight and a headlight.

Visible light communication is a technology of transmitting information by using light of an illumination device such as an LED (Light Emitting Diode) which emits light by a semiconductor, as a carrier wave. The light used for visible light communication, as a visible light having a wavelength of 780 nm to 380 nm, is characterized by the advantageous ability of performing communications simultaneously with illumination.

The taillight transmitter 120 is installed in the rear of the vehicle, and serves as a communication means as well as a brake light.

The taillight transmitter 120 transmits the weak deceleration signal and strong deceleration signal received from the brake sensor 110 backward by way of visible light communication, but if there is a following vehicle, a headlight receiver 130 thereof receives the transmitted weak deceleration signal and strong deceleration signal.

The taillight transmitter 120 is implemented including a power supply circuit for supplying power to each circuit element, a communication signal conversion circuit, a circuit for generating a carrier wave frequency and modulating a carrier wave, an LED drive circuit and the like, but a detailed explanation will be omitted here since the principle and basic technique of visible light communication are already known and practiced prior to the filing of the present disclosure.

The taillight transmitter 120 converts the weak deceleration signal and strong deceleration signal, which are electrical signals received from the brake sensor 110, into optical signals and transmits them to the following vehicle. The taillight transmitter 120 also transmits the weak deceleration signal and strong deceleration signal received from the preceding vehicle to the vehicle behind.

The headlight receiver 130 is installed in a headlight of a vehicle and receives an optical signal output from a taillight transmitter 120 of a vehicle in front and converts it into an electrical signal.

The headlight receiver 130 is implemented including a photodiode element for converting visible light received by a photodiode (LED) into an electrical signal and a driving circuit thereof, a signal amplifying circuit for increasing the magnitude of a received signal, a amplitude limiting circuit, a band pass filter circuit, a carrier wave detection circuit for reconstructing a signal modulated by a carrier wave, and the like, but detailed explanation thereof will be omitted here since the principle and basic technique of visible light communication are technologies already known and practiced before the filing of the present disclosure.

In addition to the weak deceleration signal and strong deceleration signal of the preceding vehicle, there is a possibility that a weak deceleration signal and a strong deceleration signal of the lead vehicle ahead of one or two preceding vehicles in a row are included the light signal received by the receiver 130. The number of preceding vehicles from which the headlight receiver 130 receives the weak deceleration signal and strong deceleration signal is controlled by the collision risk determination unit 150 described later.

The headlight receiver 130 transmits, to the collision risk determination unit 150, the preceding vehicle's weak deceleration signal and strong deceleration signal included in the electrical signal obtained by converting the received optical signal.

The acceleration sensor 140 is installed in an acceleration system of the vehicle, for example, an accelerator pedal, which is provided with the vehicle safety device using the visible light communication according to this embodiment.

The acceleration sensor 140 detects when the driver operates the accelerator pedal and generates an acceleration signal. The acceleration sensor 140 transmits the acceleration signal to the collision risk determination unit 150.

The collision risk determination unit 150 determines the danger of collision based on the weak deceleration signal and strong deceleration signal of the preceding vehicle, and an acceleration signal of the main vehicle.

With a weak deceleration signal or a strong deceleration signal detected from any one of the preceding vehicles, the collision risk determination unit 150 judges that there is a danger of collision upon detecting an acceleration signal of the main vehicle at the same time.

The collision risk determination unit 150 determines there is the danger of collision when, for example, the preceding vehicle driver operates the brake pedal with a strength less than a preset strength and the main vehicle driver simultaneously operates the accelerator pedal, or the preceding vehicle driver operates the brake pedal with the preset strength or more and the main vehicle driver simultaneously operates the accelerator pedal.

The collision risk determination unit 150 controls so that the taillight transmitter 120 transmits, to the following vehicle, weak deceleration signals and strong deceleration signals of just a preset number of preceding vehicles. For example, if the predetermined number is 5, control is exercised so that weak deceleration signals and strong deceleration signals of five vehicles inclusive of the main vehicle are transmitted to the following vehicle.

The collision risk determination unit 150 may be easily implemented by a combination of several AND gate ICs, or may be easily implemented by a digital circuit using a microprocessor. The collision risk determination unit 150 may also be implemented so as to interlock with the signal lines of the present disclosure by programming its function into the vehicle ECU (engine control unit).

The alarm unit 160 sends an alarm signal to the driver with a sound or lamp light upon determining the danger of collision by the collision risk determination unit 150. For example, the alarm unit 160 may say, "There's one vehicle slowing down ahead. Watch out." or it may turn on a front-alert lamp (162, not shown) to assist the driver's safe driving.

As described above, in the vehicle safety device using visible light communication according to the first embodiment of the present disclosure, the driver operating the accelerator pedal is warned by an alarm signal of one of the preceding vehicles operating a brake pedal, thereby reducing the risk of collision with a preceding vehicle as well as reducing the waste of fuel due to unnecessary acceleration.

Figure 2:
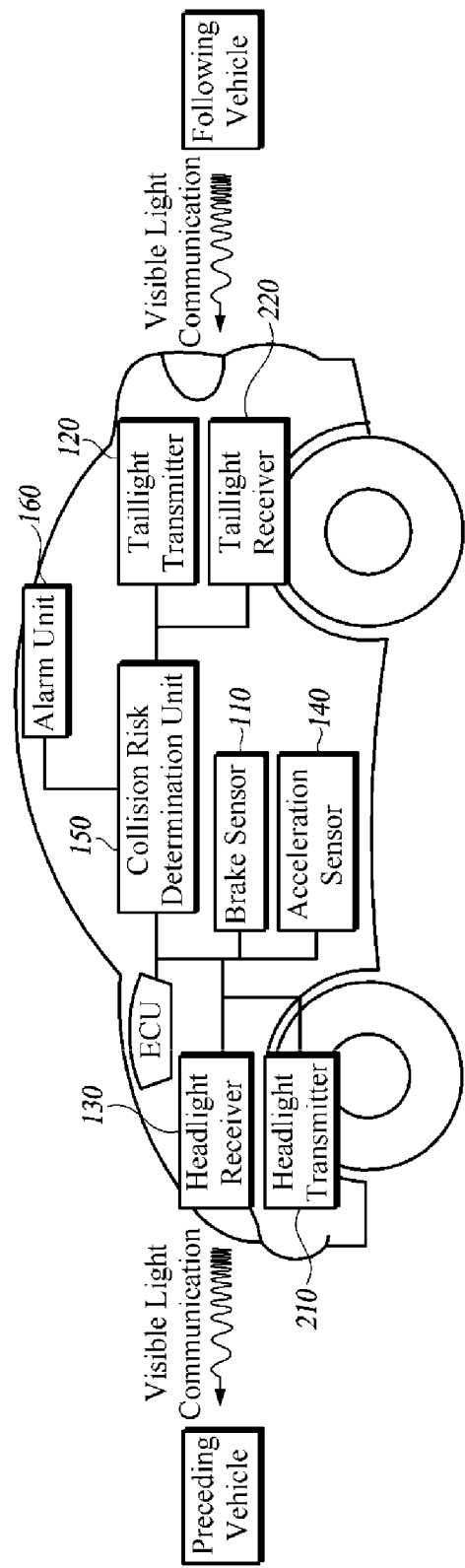
FIG. 2 is a schematic block diagram of a vehicle safety apparatus using visible light communication according to a second embodiment of the present disclosure.

FIG. 2 is a schematic block diagram of a vehicle safety apparatus using visible light communication according to a second embodiment of the present disclosure.

Referring to FIG. 2, the vehicle safety apparatus using visible light communication according to the second embodiment includes a headlight receiver 130, a headlight transmitter 210, a taillight transmitter 120, a taillight receiver 220, a brake sensor 110, an acceleration sensor 140, a collision risk determination unit 150 and an alarm unit 160.

The vehicle safety apparatus using visible light communication according to the second embodiment is equivalent to the first embodiment with additional components of the headlight transmitter 210 and the taillight receiver 220.

The headlight receiver 130, the taillight transmitter 120 and the brake sensor 110 shown in FIG. 2 are the same as those in FIG. 1. Therefore, only the difference of the acceleration sensor 140, the headlight transmitter 210, the taillight receiver 220, the collision risk determination unit 150 and the alarm unit 160 will be described.

In the vehicle safety device using visible light communication according to the second embodiment, the acceleration sensor 140 distinguishes and detects when the driver operates the accelerator pedal with a weak strength from when the driver operates the brake pedal strongly. Therefore, the acceleration sensor 140 detects an event of operating the accelerator pedal by the driver below a preset strength to generate a weak acceleration signal, and detects another event of operating the accelerator pedal by the driver with or above the preset strength to generate a strong acceleration signal.

The headlight transmitter 210 transmits the weak acceleration signal and strong acceleration signal received from the acceleration sensor 140 to the taillight receiver 220 of the preceding vehicle by using visible light communication.

As with the above-described taillight transmitter 120, the headlight transmitter 210 includes a power supply circuit for supplying power to each circuit element, a communication signal conversion circuit, a circuit for generating a carrier wave frequency and modulating a carrier wave, an LED drive circuit and the like, but a detailed explanation will be omitted here since the principle and basic technique of visible light communication are already known and practiced prior to the filing of the present disclosure.

The headlight transmitter 210 converts the weak acceleration signal and strong acceleration signal, which are electrical signals received from the acceleration sensor 140, into optical signals and transmits them to the preceding vehicle. The headlight transmitter 210 also transmits the weak acceleration signal and strong acceleration signal received from the following vehicle to the preceding vehicle. The number of following vehicles from which the taillight receiver 220 receives the weak acceleration signal and strong acceleration signal is controlled by the collision risk determination unit 150 as detailed below.

The taillight receiver 220 receives the optical signal output from the headlight transmitter 210 of the following vehicle and converts it into an electrical signal.

The taillight receiver 220 is implemented including a photodiode element for converting visible light received by a photodiode (LED) into an electrical signal and a driving circuit thereof, a signal amplifying circuit for increasing a received signal to the magnitude appropriate for processing, a amplitude limiting circuit, a band pass filter circuit, a carrier wave detection circuit for reconstructing a signal modulated by a carrier wave, and the like, but detailed explanation thereof will be omitted here since the principle and basic technique of visible light communication are technologies already known and practiced before the filing of the present disclosure.

In addition to the weak acceleration signal and strong acceleration signal of the following vehicle, there is a possibility that a weak acceleration signal and a strong acceleration signal of the trailing vehicle to one or two following vehicles in a row are included the light signal received by the taillight receiver 220.

The taillight receiver 220 transmits, to the collision risk determination unit 150, the preceding vehicle's weak acceleration signal and strong acceleration signal included in the electrical signal obtained by converting the received optical signal.

The collision risk determination unit 150 determines the danger of collision based on the weak acceleration signals and strong acceleration signals of the following vehicles, and a deceleration signal of the main vehicle.

With a weak acceleration signal or a strong acceleration signal detected from any one of the following vehicles, the collision risk determination unit 150 judges that there is a danger of collision upon detecting a weak deceleration signal or a strong deceleration signal of the main vehicle at the same time.

The collision risk determination unit 150 determines there is the danger of collision when, for example, the following vehicle driver operates the accelerator pedal with a strength less than a preset strength and the main vehicle driver simultaneously operates the brake pedal, or the following vehicle driver operates the accelerator pedal with the preset strength or more and the main vehicle driver simultaneously operates the brake pedal.

In addition, the collision risk determination unit 150 controls so that the headlight transmitter 210 transmits, to the preceding vehicle, weak acceleration signals and strong acceleration signals of just a preset number of following vehicles. For example, if the predetermined number is 2, control is exercised so that weak acceleration signals and strong acceleration signals of two vehicles inclusive of the main vehicle are transmitted to the preceding vehicle.

The collision risk determination unit 150 may be easily implemented by a combination of several AND gate ICs, or may be easily implemented by a digital circuit using a microprocessor. The collision risk determination unit 150 may also be implemented so as to interlock with the signal lines of the present disclosure by programming its function into the vehicle ECU.

The alarm unit 160 sends an alarm signal to the driver with a sound or lamp light upon determining the danger of collision by the collision risk determination unit 150. For example, the alarm unit 160 may say, "There's one vehicle speeding up behind. Watch out." or it may turn on a back-alert lamp (262, not shown) to assist the driver's safe driving.

As described above, in the vehicle safety device using visible light communication according to the second embodiment of the present disclosure, the driver operating the brake pedal is warned by an alarm signal of one of the following vehicles operating an accelerator pedal, thereby reducing the risk of collision with a following vehicle as well as informing of the adequate time to operate the brake pedal.

The vehicle safety device using visible light communication according to the second embodiment of the present disclosure includes the vehicle safety device according to the first embodiment. Therefore, the functions implemented in the second embodiment can be implemented by the functions of the first embodiment with the additional functions combined.

Figure 3:
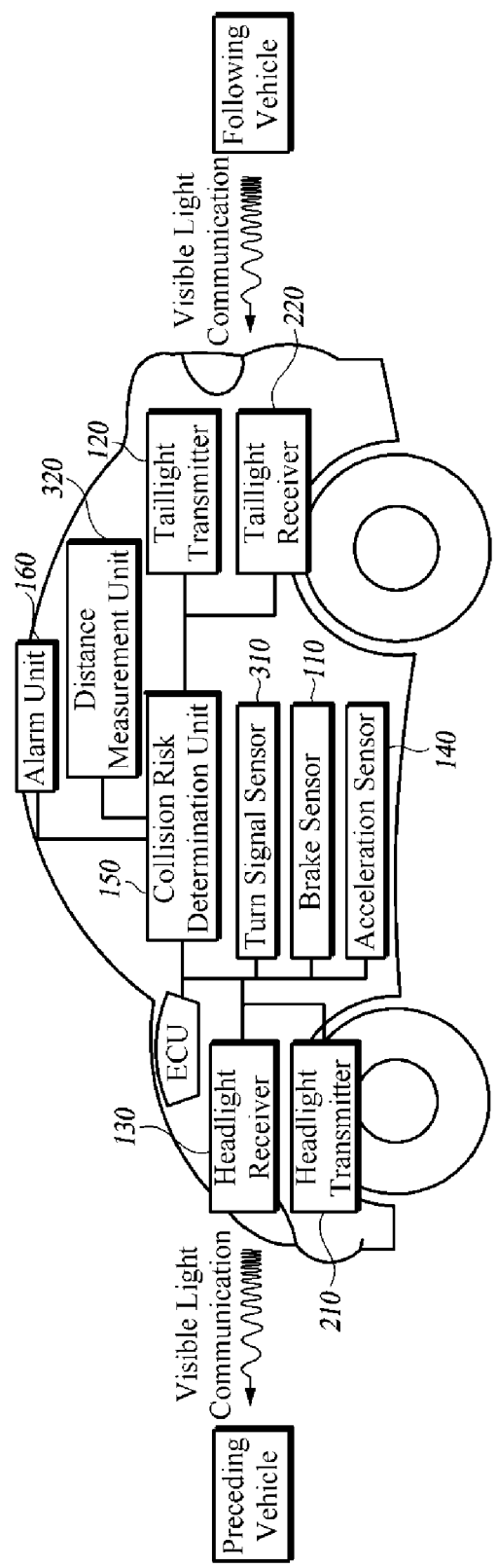
FIG. 3 is a schematic block diagram of a vehicle safety apparatus using visible light communication according to a third embodiment of the present disclosure.

FIG. 3 is a schematic block diagram of a vehicle safety apparatus using visible light communication according to a third embodiment of the present disclosure.

Referring to FIG. 3, a vehicle safety device using visible light communication according to a third embodiment of the present disclosure includes a headlight receiver 130, a headlight transmitter 210, a taillight transmitter 120, a taillight receiver 220, a brake sensor 110, an acceleration sensor 140, a turn signal sensor 310, a collision risk determination unit 150, a distance measurement unit 320 and an alarm unit 160.

The vehicle safety apparatus using visible light communication according to the third embodiment is equivalent to the second embodiment with additional components of the turn signal sensor 310 and the distance measurement unit 320.

The headlight receiver 130, the headlight transmitter 210, the taillight transmitter 120, the taillight receiver 220 and the brake sensor 110 shown in FIG. 3 are the same as those in FIGS. 1 and 2. Therefore, only the difference of the turn signal sensor 310, the distance measurement unit 320, the collision risk determination unit 150 and the alarm unit 160 will be described.

The turn signal sensor 310 is installed on a turn signal or a turn signal lever of the vehicle which is installed with the vehicle safety apparatus using visible light communication according to this embodiment.

The turn signal sensor 310 distinguishes and detects when the driver gives the left turn signal with the left turn lamp from when giving the right turn signal with the right turn lamp.

The turn signal sensor 310 transmits the left turn indicator signal and the right turn indicator signal to the collision risk determination unit 150.

The distance measurement unit 320 analyzes the visible light signal output from the head light transmitter 210 of the following vehicle and received by the taillight receiver 220 to measure the distance to the position of the following vehicle. The technique relating to the analysis of the visible light signal is already known and practiced before this application, and therefore a detailed explanation will be omitted here.

Where the measurement of the distance to the following vehicle at a position measured by the distance measurement unit 320 indicates that the following vehicle is located in the left lane of the main vehicle and the following vehicle is closer than a preset distance, the collision risk determining unit 150 determines that there is the danger of collision upon detecting the turn signal of the main vehicle and it is a left turn signal.

Where the measurement of the distance to the following vehicle at a position measured by the distance measurement unit 320 indicates that the following vehicle is located in the right lane of the main vehicle and the following vehicle is closer than a preset distance, the collision risk determining unit 150 determines that there is the danger of collision upon detecting the turn signal of the main vehicle and it is a right turn signal.

The collision risk determination unit 150 may be implemented by a combination of several digital ICs, and it may be implemented so as to interlock with the signal lines of the present disclosure by programming its function into the vehicle ECU.

The alarm unit 160 sends an alarm signal to the driver with a sound or lamp light upon determining the danger of collision by the collision risk determination unit 150. For example, when a following vehicle in the right lane is closer than preset 15 m and the main vehicle driver turns on the right turn signal, the alarm unit 160 may provide an audible guide by saying, "Right lane vehicle closing in the 15 meters. Lane change needs caution." In addition, the alarm unit 160 may turn on the back-alert lamp (262, not shown) to assist the driver's safe driving.

As described above, in the vehicle safety device using visible light communication according to the third embodiment of the present disclosure, the driver in making a lane change or steering is warned by an alarm signal depending on the distance to the following vehicle, providing a safe lane change or steering.

The vehicle safety device using visible light communication according to the third embodiment of the present disclosure includes the vehicle safety devices according to the first embodiment and the second embodiment. Therefore, the functions implemented in the third embodiment can be implemented by the functions of the first embodiment and/or the second embodiment with the additional functions combined.

Figure 4A:
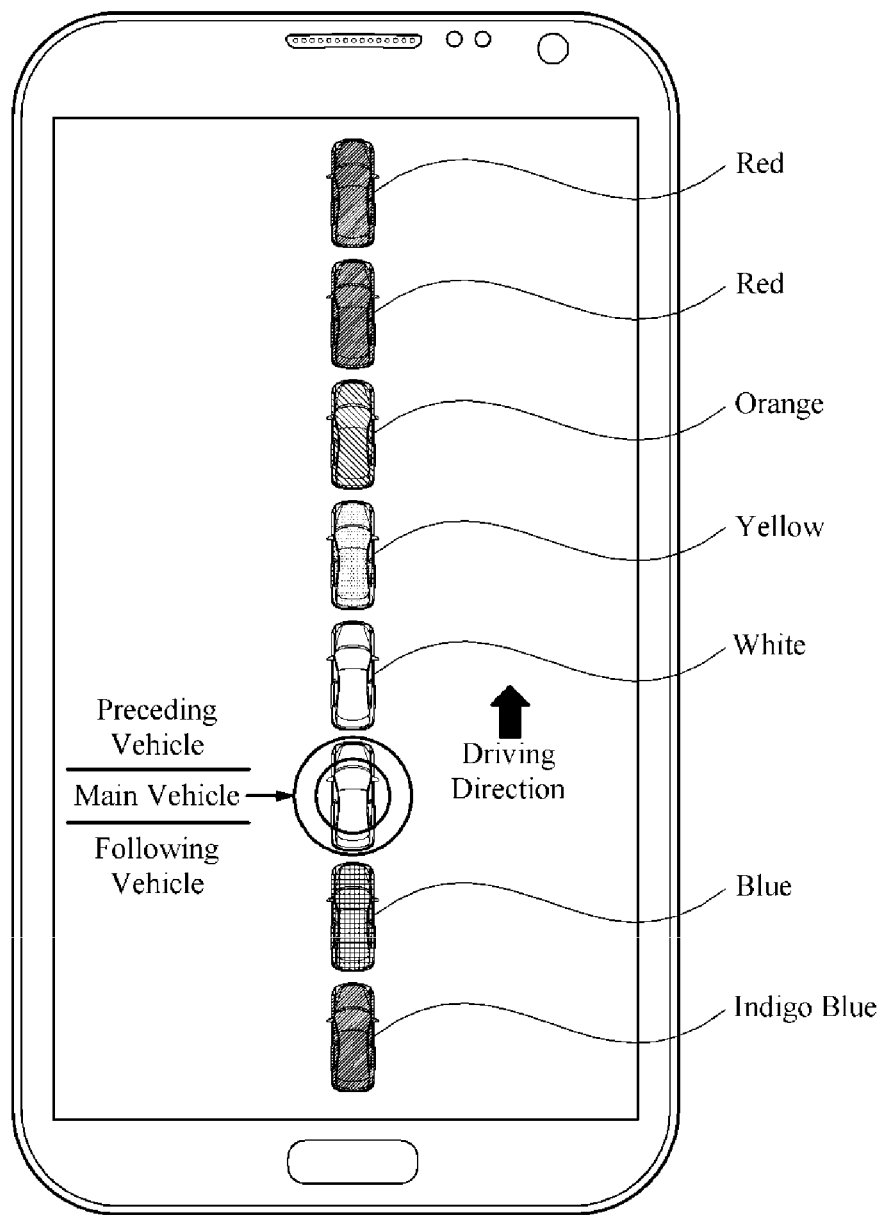
FIG. 4A and FIG. 4B are illustrations of a display device of a vehicle safety apparatus using visible light communication according to a fourth embodiment of the present disclosure.
Figure 4B:
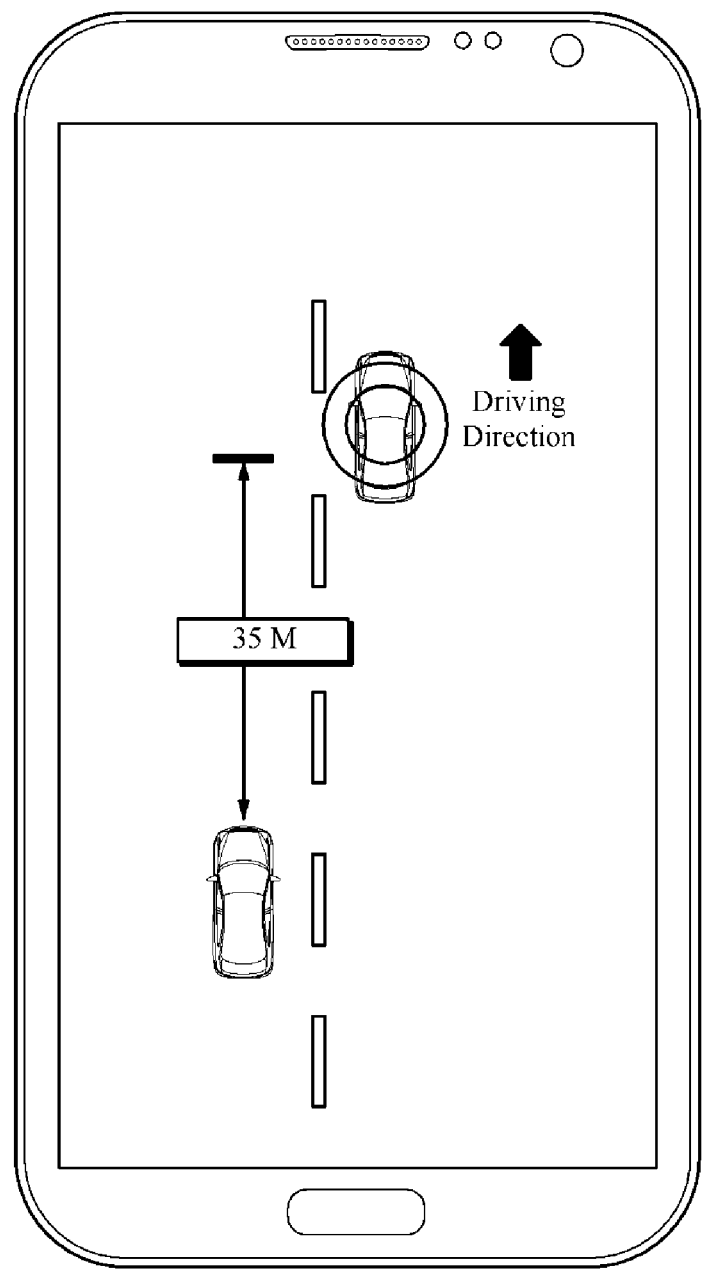

FIG. 4A and FIG. 4B are illustrations of a display device of a vehicle safety apparatus using visible light communication according to a fourth embodiment of the present disclosure.

The vehicle safety apparatus according to the fourth embodiment of the present disclosure is equivalent to the first, second or third embodiment with an additional component of a display means 400.

On the other hand, the braking sensor 110 in the vehicle safety device using visible light communication according to the fourth embodiment distinguishes and detects when the driver's foot is put on the brake pedal from when the driver's operation of the brake pedal is weak and when the driver operates the brake pedal with a strong force.

Therefore, the brake sensor 110 detects when the driver applies a slight pressure to the brake to generate a deceleration preparation signal, and detects an event of operating the brake pedal with a strength less than a preset strength to generate a weak deceleration signal, and detects an event of operating the brake pedal with the preset strength or more to generate a strong deceleration signal.

The brake sensor 110 transmits a deceleration preparation signal, a weak deceleration signal and a strong deceleration signal (hereinafter, referred to as deceleration information) to the taillight transmitter 120.

The headlight receiver 130 receives the deceleration information outputted by the taillight transmitter 120 of the preceding vehicle.

In addition, the taillight receiver 220 receives the weak acceleration signal and strong acceleration signal (hereinafter, referred to as acceleration information) output from the headlight transmitter 210 of the following vehicle.

The collision risk determination unit 150 transmits the above-described deceleration information of the preceding vehicles and the acceleration information of the following vehicles to the display means 400.

The display means 400 is a device for displaying the deceleration information of the preceding vehicles and the acceleration information of the following vehicles to the driver so as to provide the vehicle safety service for the driver. The display means 400 may be implemented in any form of terminals including a tablet PC, a smartphone, a personal portable information terminal (PDA: Personal Digital Assistant), a mobile communication terminal and a vehicle navigation terminal. The connection between the display means 400 and the collision risk determination unit 140 is not limited to any one of radio frequency (RF), visible light communication (VLC) and wired connection cable, and various other methods may be used.

FIG. 4A is a view showing an information screen of a means for displaying preceding and following vehicles in the vehicle safety apparatus using visible light communication according to the fourth embodiment.

As shown in FIG. 4A, the information screen for displaying preceding and following vehicles according to the fourth embodiment displays the main vehicle along with its preceding vehicles and following vehicles in the form of car icons.

The display means 400 displays the preceding vehicles and the following vehicles by preset numbers to the driver. For example, as shown in FIG. 4A, the display means 400 may display five preceding vehicles, the main vehicle and two following vehicles.

The display means 400 displays a preceding vehicle when preparing to decelerate by a yellow car icon, a preceding vehicle in deceleration by an orange car icon, a preceding vehicle in maximum deceleration by a red car icon, and a preceding vehicle generating no deceleration signal by a white or green car icon.

The display means 400 displays a following vehicle in steady acceleration by a blue car icon, a following vehicle in maximum acceleration by an indigo blue car icon, and a following vehicle generating no acceleration signal by a white or green car icon.

The display means 400 displays the main vehicle between the preceding vehicles and the following vehicles and displays a symbol indicating that main vehicle is the subject. For example, a circle symbol may be displayed around the subject vehicle for identification.

Referring to FIG. 4A, when the drivers of preceding vehicles place their feet on the brake pedals, or they operate the brake pedals with a strength less than a preset strength, or they operate the same with the preset strength or more, the display means 400 displays the corresponding car icons in yellow, orange and red, respectively. In addition, when the drivers of following vehicles operate their accelerator pedals, or they operate the accelerator pedals with a preset strength or more, the display means 400 displays the corresponding car icons in blue and indigo blue, respectively.

FIG. 4B is a view showing a lane change screen of a display means of the vehicle safety apparatus using visible light communication according to the fourth embodiment of the present disclosure.

The vehicle safety device using visible light communication according to the fourth embodiment may be implemented to usually display the preceding and following vehicle information screens shown in FIG. 4A and switch to display the lane change screen shown in FIG. 4B in response to the driver's activation of the turn signal.

At this time, the lane change screen displays the vehicle behind the next lane along with the main vehicle, and displays the distance between the main vehicle and the following vehicle.

For example, when the main vehicle driver turns on the left turn signal light, the distance is displayed between the following vehicle in the left lane and the main vehicle.

As described above, in the vehicle safety device using visible light communication according to the fourth embodiment, intuitive information is displayed for the driver on the display unit about whether the drivers of the preceding vehicles are placing their feet on the brake pedals, operating the brake pedals, or depressing the brake pedals to the fullest. This informs the driver of the timing for operating the accelerator pedal especially on the congested road, reduces the risk of collision with the preceding vehicles, and tells the driver, when making a lane change or steering, the distance to the following vehicle.

Unlike the conventional vehicle safety device which reports to the main vehicle exclusively by vehicle-to-vehicle communications with upwardly or downwardly changing speeds of the preceding vehicle, the present disclosure in some embodiments provides the driver with an early information of when the preceding vehicle's driver places the foot on the brake pedal even before a deceleration of the preceding vehicle, and thereby enables the driver to instantaneously detect traffic changes due to traffic situations further ahead, which is greatly useful for safe driving.

In addition, a vehicle safety device using visible light communication according to some embodiment of the present disclosure needs no separate external network, requiring low device complexity toward a high distribution rate. This enables the driver to easily grasp the state of the road traffic at a glance allowing for instantaneous response thereto without using a collision algorithm.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the explicitly described above embodiments but by the claims and equivalents thereof.

The invention claimed is:

1. A vehicle safety apparatus using visible light communication, comprising:
   a brake sensor mounted to a brake pedal of a main vehicle to generate a deceleration signal according to a degree of braking;
   an acceleration sensor mounted to an accelerator pedal of the main vehicle to generate an acceleration signal according to a degree of acceleration;
   a visible light receiver configured to receive a preceding-vehicle signal from at least one preceding vehicle and a following-vehicle signal from at least one following vehicle;
   a visible light transmitter configured to transmit a main vehicle signal to the preceding vehicle and the following vehicle;
   a collision risk determinator configured to determine whether there is a danger of collision based on the preceding-vehicle signal, the following-vehicle signal and the main vehicle signal; and
   an alarm configured to issue an alarm to a driver in response to the collision risk determinator determining the presence of a danger of collision.

2. The vehicle safety device using visible light communication of claim 1, wherein
   the brake sensor is configured to
      generate a weak deceleration signal in response to a driver's operation of the brake pedal with a force under a first predetermined level, and
      generate a strong deceleration signal in response to a driver's operation of the brake pedal with a force at or above the first predetermined level; and
   the acceleration sensor is configured to
      generate a weak acceleration signal in response to a driver's operation of the accelerator pedal with a force under a second predetermined level, and
      generate a strong acceleration signal in response to a driver's operation of the accelerator pedal with a force at or above the second predetermined level.

3. The vehicle safety device using visible light communication of claim 1, wherein the visible light transmitter is configured to
   transmit the preceding-vehicle signal to the following vehicle, and
   transmit the following-vehicle signal to the preceding vehicle.

4. The vehicle safety device using visible light communication of claim 1, wherein the collision risk determinator is configured to be responsive to the strong acceleration signal received from the preceding vehicle for determining the presence of the danger of collision.

5. The vehicle safety device using visible light communication of claim 1, wherein the collision risk determinator is configured to
receive the weak deceleration signal or the strong deceleration signal from any one of preceding vehicles in front of the main vehicle, and
determine the presence of the danger of collision when the acceleration signal of the main vehicle is detected.

6. The vehicle safety device using visible light communication of claim 1, wherein the collision risk determinator is configured to
receive the weak acceleration signal or the strong deceleration signal from any one of following vehicles behind the main vehicle, and
determine the presence of the danger of collision when detecting the weak deceleration signal or the strong deceleration signal of the main vehicle.

7. The vehicle safety device using visible light communication of claim 1, wherein the alarm is configured to issue the alarm by using sound and a lamp.

8. The vehicle safety device using visible light communication of claim 1, further comprising:
a turn indicator sensor installed in a turn signal switch of the main vehicle for detecting a turn signal; and
a distance calculator configured to calculate a distance of a following vehicle in an adjacent lane from the main vehicle by using the following-vehicle signal, and
wherein the visible light transmitter transmits the main vehicle signal to a preceding vehicle in an adjacent lane, and
the visible light receiver receives the following-vehicle signal from a following vehicle in an adjacent lane.

9. The vehicle safety device using visible light communication of claim 8, wherein the collision risk determinator is configured to determine the presence of the danger of collision when the following vehicle is located in a left lane of the main vehicle, the distance of the following vehicle is shorter than a predetermined distance, and the turn indicator sensor of the main vehicle detects a left turn signal.

10. The vehicle safety device using visible light communication of claim 8, wherein the collision risk determinator is configured to determine the presence of the danger of collision when the following vehicle is located in a right lane of the main vehicle, the distance of the following vehicle is shorter than a predetermined distance, and the turn indicator sensor of the main vehicle detects a right turn signal.

11. The vehicle safety device using visible light communication of claim 8, wherein the display means is configured to be responsive to the turn indicator sensor detecting a left turn signal of the main vehicle for displaying a distance of a following vehicle in a left lane of the main vehicle from the main vehicle, which is calculated by the distance calculation unit, and
the display means is configured to be responsive to the turn indicator sensor detecting a right turn signal of the main vehicle for displaying a distance of a following vehicle in a right lane of the main vehicle from the main vehicle, which is calculated by the distance calculation unit.

12. The vehicle safety device using visible light communication of claim 8, further comprising:
a display means configured to display to the driver of information on deceleration signals of preceding vehicles of the main vehicle and information on acceleration signals of following vehicles behind the main vehicle.

13. The vehicle safety device using visible light communication of claim 1, further comprising:
a display means configured to display to the driver of information on deceleration signals of preceding vehicles of the main vehicle and information on acceleration signals of following vehicles behind the main vehicle.

14. The vehicle safety device using visible light communication of claim 13, wherein the brake sensor is configured to generate a deceleration preparation signal when the driver starts to detect the deceleration signal.

15. The vehicle safety device using visible light communication of claim 14, wherein the display means is configured to display to the driver of the deceleration signals of the preceding vehicles and the acceleration signals of the following vehicles by respective predetermined numbers of vehicles.

16. The vehicle safety device using visible light communication of claim 15, wherein the predetermined numbers of the vehicles are initially set up with five preceding vehicles and two following vehicles.

17. The vehicle safety device using visible light communication of claim 15, wherein the display means is configured to display the deceleration signal of the at least one preceding vehicle by a symbol of a vehicle shape which becomes yellow in response to the deceleration preparation signal from the preceding vehicle, orange in response to the weak deceleration signal from the preceding vehicle, red in response to the strong deceleration signal from the preceding vehicle, and white or green when no deceleration signal is received from a relevant vehicle.

18. The vehicle safety device using visible light communication of claim 15, wherein the display means is configured to display the acceleration signal of the at least one following vehicle by a symbol of a vehicle shape which becomes blue in response to the weak acceleration signal from the following vehicle, indigo blue in response to the strong acceleration signal from the following vehicle, and white or green when no acceleration signal is received from a relevant vehicle.

19. The vehicle safety device using visible light communication of claim 1 wherein a visible light receiver is located in a taillight and headlight of the main vehicle; and wherein a visible light transmitter is located in a taillight and headlight of the main vehicle.

* * * * *